(12) United States Patent
Yang et al.

(10) Patent No.: US 7,357,551 B2
(45) Date of Patent: Apr. 15, 2008

(54) IMAGE DISPLAY DEVICE WITH MICROLIGHT SOURCES AND SOFT LIGHT PANEL

(76) Inventors: Zhongyi Yang, 401-6 Building, No. 62, Huaguo Road, Shekou District, Shenzhen City, Guangdong Province 518067 (CN); Lijuan Zhang, 401-6 Building, No. 62, Huaguo Road, Shekou District, Shenzhen City, Guangdong Province 518067 (CN); Shuaibing Yang, 401-6 Building, No. 62, Huaguo Road, Shekou District, Shenzhen City, Guangdong Province 518067 (CN); Yangjing Zhang, 401-6 Building, No. 62, Huaguo Road, Shekou District, Shenzhen City, Guangdong Province 518067 (CN)

( * ) Notice: Subject to any disclaimer, the term of this patent is extended or adjusted under 35 U.S.C. 154(b) by 473 days.

(21) Appl. No.: 10/512,293
(22) PCT Filed: Apr. 17, 2003
(86) PCT No.: PCT/CN03/00280

§ 371 (c)(1),
(2), (4) Date: Oct. 25, 2004

(87) PCT Pub. No.: WO03/091973

PCT Pub. Date: Nov. 6, 2003

(65) Prior Publication Data

US 2005/0160644 A1 Jul. 28, 2005

(30) Foreign Application Priority Data

| Apr. 25, 2002 | (CN) | ................................ 02 2 33209 |
| Apr. 28, 2002 | (CN) | ................................ 02 2 33369 |
| Apr. 28, 2002 | (CN) | ................................ 02 2 33370 |
| Apr. 28, 2002 | (CN) | ................................ 02 2 33371 |

(51) Int. Cl.
*F21V 7/04* (2006.01)
*F21V 17/01* (2006.01)

(52) U.S. Cl. .................. 362/606; 362/320; 362/812
(58) Field of Classification Search ............... 362/606, 362/812
See application file for complete search history.

(56) References Cited

U.S. PATENT DOCUMENTS 4,904,901 A * 2/1990 Simopoulos et al. ........ 313/509

(Continued)

FOREIGN PATENT DOCUMENTS

CN 2225082 4/1996

(Continued)

OTHER PUBLICATIONS

Partial English Translation of the Specification and Description of Drawings of CN 2244235 dated Jan. 1, 1997.

(Continued)

*Primary Examiner*—Ali Alavi
*Assistant Examiner*—William J. Carter
(74) *Attorney, Agent, or Firm*—Matthias Scholl P.C.; Matthias Scholl

(57) ABSTRACT

An image display device with microlight and soft light panel includes light sources and a transparent panel. The said light sources are inlayed in the grooves of the edges of the said panel. The said images to be displayed are mounted on the surface of the panel or formed by the concave-convex parts inside or outside the surface. With the illumination of the micro power light sources, the device gives a soft light indirectly through the reflection or refraction of the light and can be used for long continued illumination indoors or outdoors or in dark conditions. The images that the device gives look clear and have strong stereo feelings and various changes. The device has lower costs and longer life and can be particularly used as safe and fire-fighting image signs in dark places such as cinemas, underpasses etc. Also it can be used for illumination.

18 Claims, 4 Drawing Sheets

U.S. PATENT DOCUMENTS

| | | | |
|---|---|---|---|
| 5,144,328 A * | 9/1992 | Blake et al. | 347/101 |
| 5,518,561 A * | 5/1996 | Rosa | 156/71 |
| 5,640,792 A | 6/1997 | Smith et al. | |
| 6,193,385 B1 * | 2/2001 | Maki et al. | 362/108 |
| 6,597,348 B1 * | 7/2003 | Yamazaki et al. | 345/175 |
| 2002/0131267 A1 * | 9/2002 | Van Osenbruggen | 362/109 |

FOREIGN PATENT DOCUMENTS

| | | |
|---|---|---|
| CN | 2244235 | 1/1997 |
| CN | 1165363 | 11/1997 |
| CN | 2275749 | 3/1998 |
| CN | 2336436 | 6/1999 |
| CN | 2332026 | 8/1999 |
| CN | 2344832 | 10/1999 |
| CN | 2413337 | 1/2001 |
| CN | 2427001 | 4/2001 |
| CN | 2427861 | 4/2001 |
| CN | 2435808 | 6/2001 |

OTHER PUBLICATIONS

Partial English Translation of the Specification of CN 2332026 dated Aug. 4, 1999.
Partial English Translation of the Specification of CN 2225082 dated Apr. 17, 1996.
Partial English Translation of the Specification of CN 2427861 dated Apr. 25, 2001.
Partial English Translation of the Specification of CN 2413337 dated Jan. 3, 2001.
English Translation of Abstract of CN 2427001 dated Apr. 18, 2001.
English Translation of Abstract of CN 2275749 dated Mar. 4, 1998.
English Translation of Abstract of CN 2344832 dated Oct. 20, 1999.
English Translation of Abstract of CN 1165363 dated Nov. 19, 1997.
English Translation of Abstract of CN 2336436 dated Sep. 1, 1999.
English Translation of Abstract of CN 2435808 dated Jun. 20, 2001.

* cited by examiner

IMAGE DISPLAY DEVICE WITH MICROLIGHT SOURCES AND SOFT LIGHT PANEL

FIELD OF INVENTION

The present invention relates to display technology of set image, particularly relates to display technology of set image through the reflection or refraction of the light with the illumination of the micro power light sources. It pertains to the application field of electronics and new material.

BACKGROUND OF INVENTION

Presently most of various kinds of billboards, fire-fighting electronic indicators and so on us the structure of neon light, electroluminescence (EL) luminescence source panel and fluorescent lamp box. Although the neon lights used by the said billboards have high luminance, they have too high voltage, short life, high electricity wastage and high maintenance cost. The said electroluminescence (EL) luminescence source panel needs 80-100v AC voltage of hundreds of cycles, therefore striking fire easily occurs. Also its luminance is lower and life is shorter. The said cold cathode display device requires the electricity source of more than one thousand voltage so that its life is universal problem except safe problem. Present familiar thin film electroluminescence (EL) luminescence source fire-fighting electronic indicators consumes 3-5 watt according to international and domestic standard size. The fire-fighting electronic indicators is substantially single-colour and its luminance will decrease much after it is used ten thousand hours.

The luminescence device which is formed by matrix arrangement of light-emitting diodes can meet the requirement of outdoor high luminance. However it needs many light-emitting diodes and consumes much electricity. Also its image display effect is poor and visual angle is small so that it has no enjoy.

In a word, the above these display devices have short life, cant work under safe voltage, consume too much electricity power when long continued work, are not advantageous to environment protection and need complex maintenance and too high maintenance cost. Although using matrix arrangement of luminescence diodes can resolve the above safe and life problems, it can't resolve high electricity wastage and poor display effect.

DESCRIPTION OF INVENTION

The first aim of the said image display device with microlight and soft light panel according to the present invention is to provide an image display device that is supplied power under safe and low voltage, consumes small watt and is suited to long continued work. The second aim of the present invention is to provide an image display device that has clear image, strong stereo feeling, various changes, wider use, lower costs, longer life and larger visual angle. The third aim is to provide an image display device that is used together with solar cells.

The said image display device with microlight and soft light panel according to the present invention is consisted of microlight sources and soft light panel display. The said soft light panel display at least includes image sandwich structure which is consisted of the panel made of transparent material and its surface. The said microlight sources is consisted of dot light sources and tubular light sources which are mounted in the groove at edges, the holes or side-end of panel of the said soft light panel display in the manner of inlay or cling. The said microlight sources are covered with frames for shading of light.

In the said above image display device with microlight and soft light panel, the said image sandwich structure is formed through filling astigmatism material and lighting material in the concave part of the panel surface or printing astigmatism material and lighting material by spraying, smearing.

In the said above image display device with microlight and soft light panel, the said image sandwich structure is composed of rough surfaces or frosting surface made of panel surfaces, or ink silk printing or UV ink silk printing which is matching with the panel.

In the said above image display device with microlight and soft light panel, the said image sandwich structure is formed through the shading light layer covering with the image part of the panel or the shading light layer covering with the non-image part of the panel.

In the said above image display device with microlight and soft light panel, the said image sandwich structure is composed of the concavo-convex stereo images formed on the panel surfaces or the concavo-convex stereo transparent material inlayed in the panel surfaces.

In the said above image display device with microlight and soft light panel, the said shading light layer is color transparent or opaque printing layer.

In the said above image display device with microlight and soft light panel, the thin metal board which is windowed as images covers on the panel surface. The thin metal board single-side covers on the surface or envelop it. Image windows are mounted on the front and back surfaces of the panel.

In the said above image display device with microlight and soft light panel, the panel is double-layer superposed. There is an image carrier between the two layers. The image carrier is selected from: (1) words or its duplicate, (2) black and white or color film, (3) picture prepared through printing with non-drying glue, lettering or spraying with reflecting-light film. The carrier is opaque, translucence or transparent. The spectrum characteristic of the microlight sources can be selected according to the colors of carrier and picture.

In the said above image display device with microlight and soft light panel, the said image sandwich structure is formed through regular small holes densely distributing on the panel. The small holes have certain depth. The powder and/or glue-mixed powder astigmatism material and lighting material or paints, dyes which have different spectrum characteristic is filled and encapsulated in the small holes.

In the said above image display device with microlight and soft light panel, the panel is superposed with more than two layers. Image carriers can be mounted between two adjoining layers.

In the said above image display device with microlight and soft light panel, the panel can be arc or columniform except flat.

In the said above image display device with microlight and soft light panel, image layers are mounted on the front and back surfaces of the panel. The shading-light layer mounted in the middle layer of the panel isolate the said two image layers.

In the said above image display device with microlight and soft light panel, the device is composed of many display devices to form a groupware when it is used for large size display or vehicle cards.

In the said above image display device with microlight and soft light panel, the grooves are arranged with equidistance parallel to the panel surface on all or part of side-end of the panel. The end faces of the grooves can be curved. Many light-emitting diodes are arranged in the grooves and packaged respectively.

The device of the present invention has many effects and advantages stated below.

1. Its image looks clear, soft and stereo.
2. It has multi-color feature.
3. Dot light sources change into soft plan light sources. It has higher luminance, longer life, lower voltage and lower cost.
4. It can be used in many fields such as billboards, fire-fighting electronic displays, large-size simulation displays, initiative light-emitting vehicle cards, city lighting projects, indoor or outdoor decoratements, art works, traffic displays, light sources of back faces of LCD screens and so on.

BEST MODE OF CARRYING OUT THE INVENTION

Figure 1:
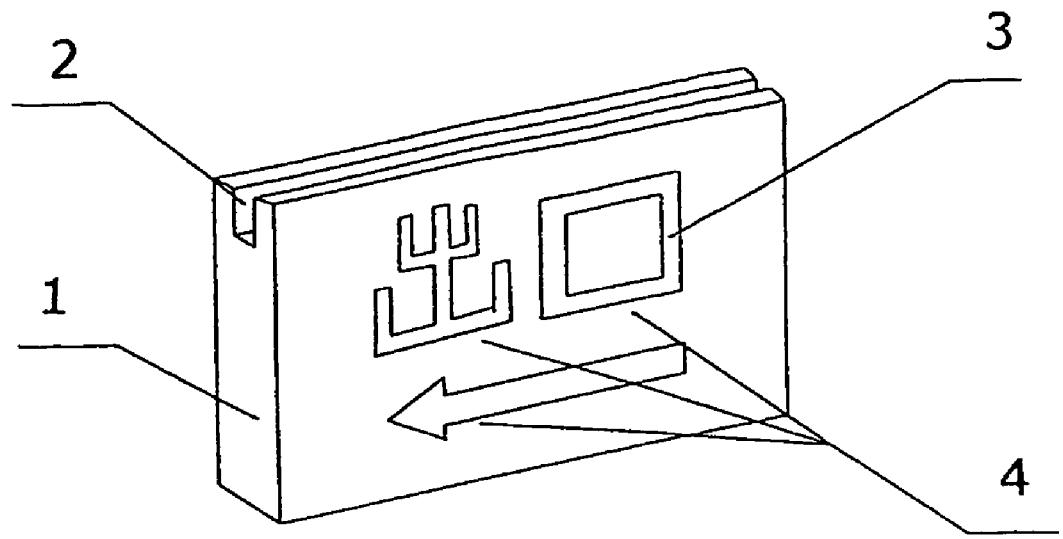
FIG. 1 is the general structure drawing showing image display device with microlight and soft light panel according to the present invention.
Figure 2:
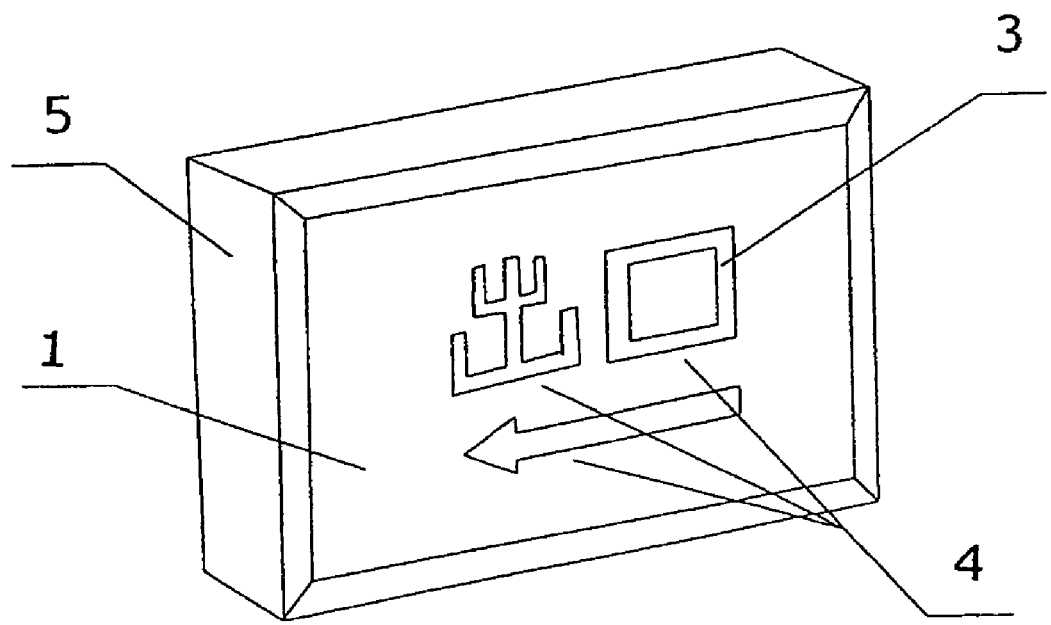
FIG. 2 is the schematic drawing showing edgings of image display device with microlight and soft light panel according to the present invention.

An image display device with microlight and soft light panel includes light sources (not showed in figures), transparent panel 1. The said light sources are inlayed in the groove or hole 2 of the side-end of the said panel 1. The said images 4 to be displayed are mounted on the surfaces of the said panel 1 or the concavo-convex part 3 inside or outside the said panel 1.

In an embodiment, the said light sources include micro bulbs or energy-saving luminous tube. The said groove 2 is claded with shading-light frame 5.

In another embodiment, the said light sources include dies of light-emitting diodes or paster parts which are encapsulated or not. The said light-emitting diode can be of white light or single color light. The said groove 2 is claded with shading-light frame 5. The characteristics of micro power and long life can be exhibited enough in the embodiment.

In an embodiment, the said images 4 to be displayed can be directly printed or pasted or printed on the said panel 1 with non-drying glue, reflecting-light film or double-face glue. It can be silk printed with lighting ink, paint or UV ink also to easier automatically produce so that cost can be largely reduced and production efficiency can be increased.

In another embodiment, the said images 4 to be displayed are consisted of the concavo-convex part 3 inside or outside the said panel 1. The concavo-convex part 3 can be formed through carving, boring or molding, injection molding. The space between the concavo-convex part 3 and the panel 1 or air will become light region because of reflection or refraction of light so as to display the soft light panel images.

The said images 4 to be displayed can be consisted of densely distributing small holes or small concavo-convex part 3 also. Light reflected by these small holes or small concavo-convex part 3 fills out the said images. This also provides space enough to construct images.

Figure 3:
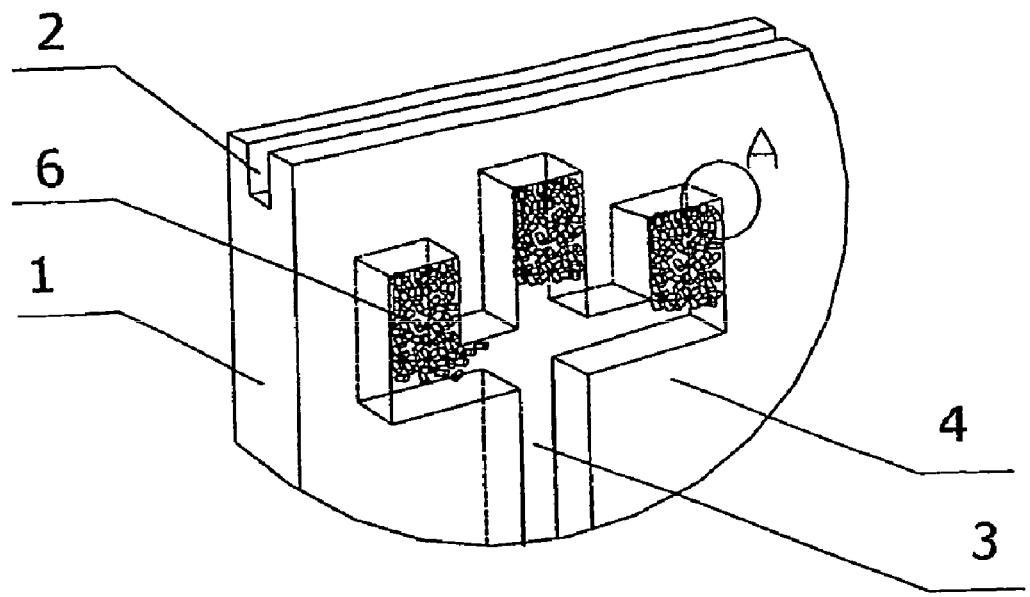
FIG. 3 is the schematic drawing showing fine optical fiber particle lighting material filling in the concavo-convex parts.
Figure 4:
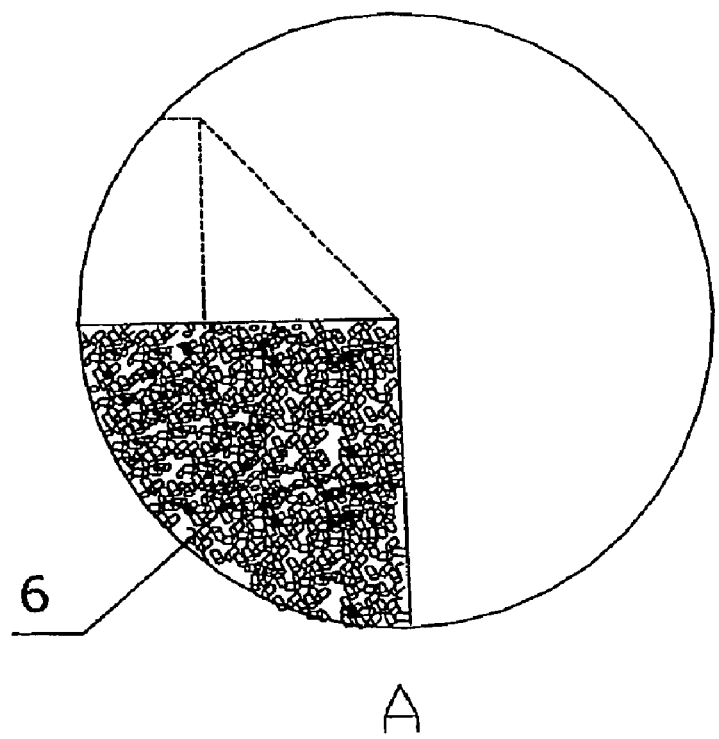
FIG. 4 is the enlarged schematic drawing showing part A in the optical fiber particle filling.
Figure 5:
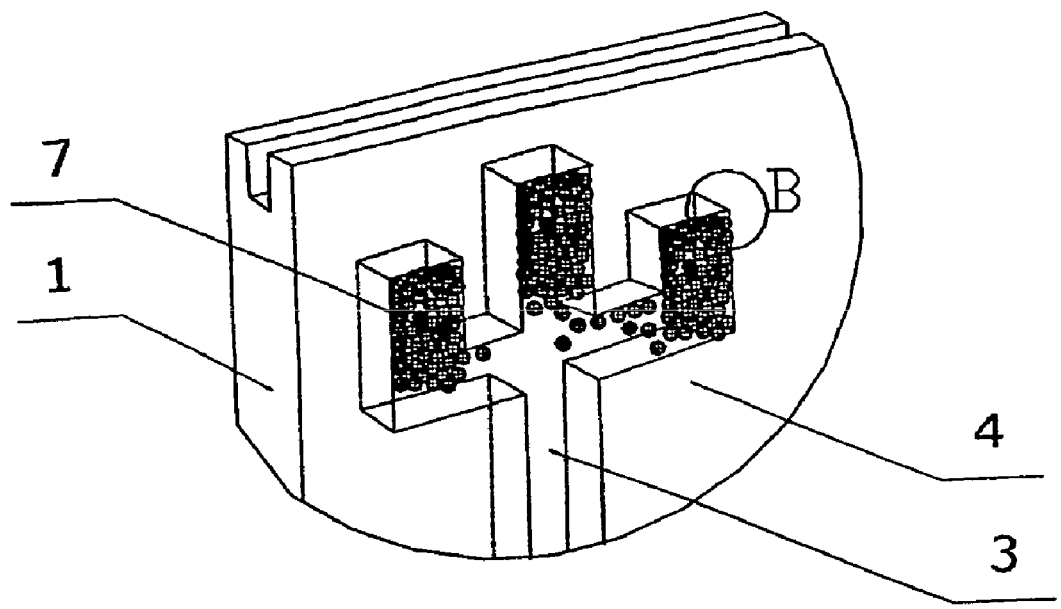
FIG. 5 is the schematic drawing showing micro glass bead lighting material filling in the concavo-convex parts.
Figure 6:
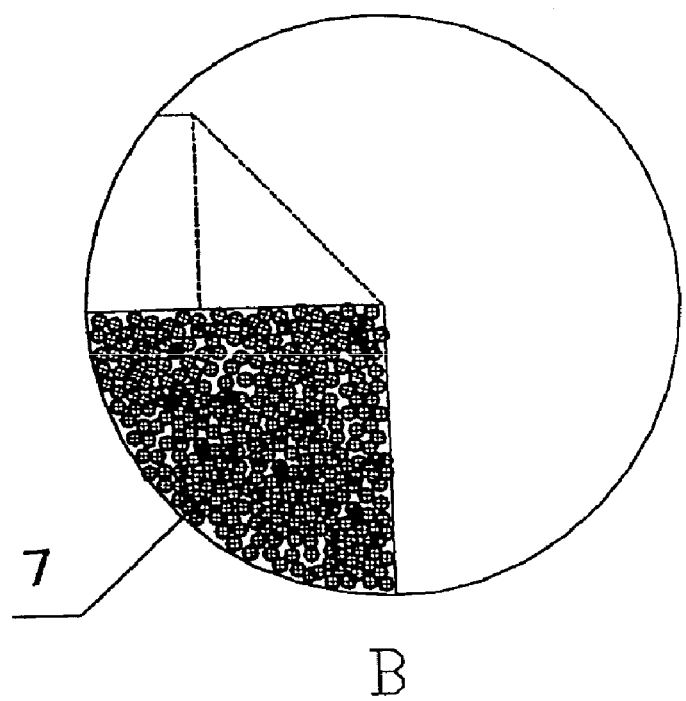
FIG. 6 is the enlarged schematic drawing showing part A in the micro glass bead filling.
Figure 7:
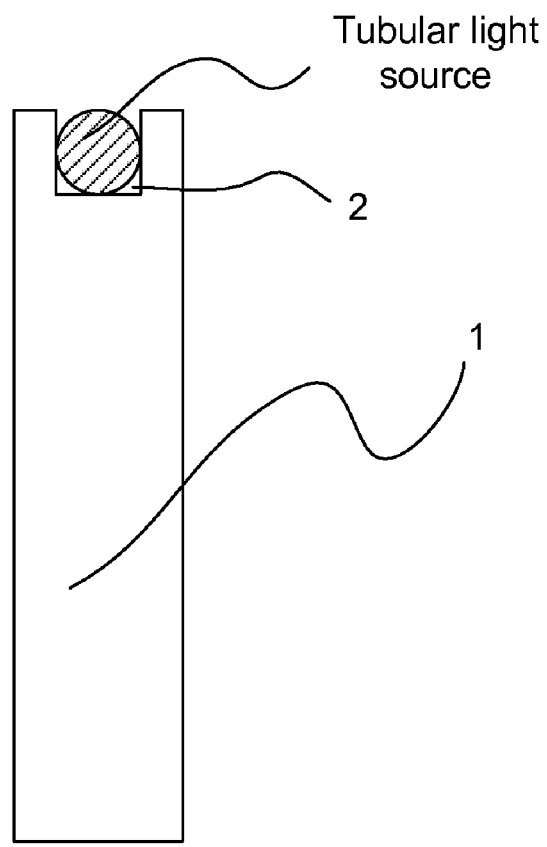
FIG. 7 is a side elevational view of an image display device with a tubular light source according to one embodiment of the present invention.
Figure 8:
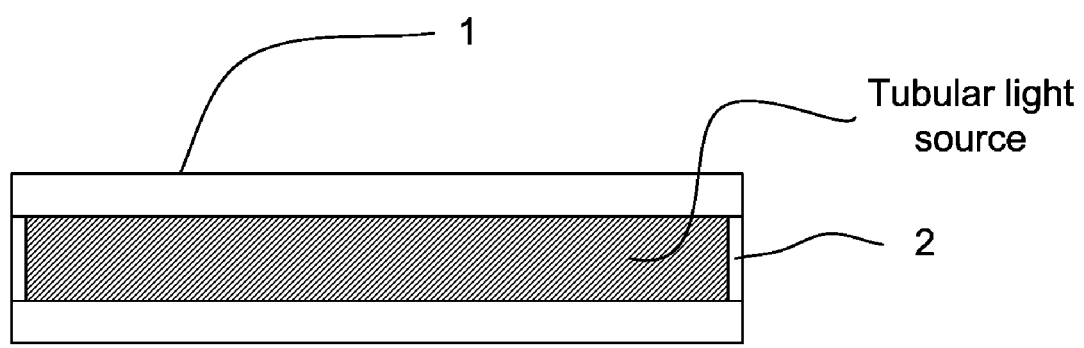
FIG. 8 is a top plan view of an image display device with a tubular light source according to one embodiment of the present invention.

In the embodiment in which the said images 4 to be displayed is consisted of the said small holes or small concavo-convex part 3, the said small holes or small concavo-convex part 3 can be filled with long- or short-afterglow photoluminescence material made fast with transparent lighting glue. The light-emitting material filled increases formality of images and its afterglow strengthens display effect.

the said small holes or small concavo-convex part 3 can be filled with fine powder material to reflect or refract, such as the said cut optical fiber 6 in part A of FIG. 3 and FIG. 4, the said micro glass beads 7 in part B of FIG. 5 and FIG. 6, even glass powder or glass cut powder. Then they are felt with transparent lighting glue matching with material of the panel. The optical fiber 6 or the micro glass beads 7 works to reflect or refract many times and has fully shinning feeling except formality.

The said small holes or small concavo-convex part 3 can be filled with lighting oil paint, ink or paint which has certain diaphaneity and matches with the spectrum of the said light sources. In this embodiment, the said small holes or small concavo-convex part 3 is filled nothing so that its weight is reduced and display effect is increased. Moreover, it matches with light spectrum and has beautiful color.

In addition, the said small holes or small concavo-convex part 3 can be coated with dye and colorless lighting transparent glue which has certain diaphaneity and matches with the spectrum of the said light sources. Its color is beautiful also.

In the application, the said images or words can be directly silk printed on the panel with lighting transparent or semitransparent glue which has different reflection and refraction coefficient from that of the panel.

The said images or words can be directly pasted with non-drying glue, reflecting-light film or double-face glue.

The panel acting as photoconduction board used some material such as light-guiding board, plastic optical fiber board or transparent organic glass, transparent glass steel, transparent engineering plastics and glass. One, two, three or four ends of the panel are inlayed light-emitting diodes, micro cold cathode tubes or micro bulbs acting as light sources. The invention mainly uses light-emitting diodes. In the part to display images, concave image is sculpted. The said images include words, numbers, Chinese words, characters and so on. Reflection material which has different reflection coefficient, refraction material or instant-depositing-emitting-light lighting material is coated in the concave groove. According to spectrum characteristic of light-emitting diode, when the diodes are electrified, different color soft light emits from the edges of images to display images.

The said image display device can have light on single or double surfaces. In the single-surface instance, anti-image is displayed on the back surface.

If white light-emitting diodes are used as light sources, in the panel which is light-isolated, the part which is filled with different kinds of lighting material emits multi-color soft light.

Images can be sculpted, injection-molded or punched through. But a thin base board is used as pad this time. If double surfaces are needed to emit light, the base board should be transparent. There had better be a thin transparent faceplate on it.

The said image display device is mainly consisted of micro light sources, photoconduction board, concave image lighting material in the part to display images, for example FIG. 3 and FIG. 5.

Wherein, micro light sources can be light-emitting diode or micro bulb, micro cold cathode tube or micro energy-saving tube. But in the consideration of sources and colors, light-emitting diode is best.

The light-emitting diode can use light-emitting tube of different pipe diameter and wavelength and die and paster part. The said die and paster part is more economical and easy to minimize size.

The said photoconduction board can use plastic optical fiber, transparent organic glass or transparent engineering plastic board, glass or transparent glass steel. Its thickness can be selected according to size of tube and actual use.

Instant-storing-emitting-light lighting material which has different reflection and refraction coefficient from the said photoconduction board and micro DC source are required. The source has 3-36V voltage and is selected as use. It is safe to human and device.

In the process to manufacture image on photoconduction panel, the groove needs to be sculpt at certain depth to display desired images. However, it can be sculpt through or mold pressing or injection-molding in order to have certain effect.

Size of light-emitting diode can be selected according to its function and luminance. When the panel is thin, tube die or paste part can be used directly.

According to actual color requirement, light-emitting diode of different wavelength or their mixture can be used.

In order to ensure its life and safe, diodes should be combined with current-limiting resistances.

According to actual use, ordinary or high luminance light-emitting diode is selected to use from the consideration of luminance and price.

Photoconduction board is also called as light-guiding board. Different thicken is used according to different use. It can be made into plate, arc, curving, semi-circular or circular according to use.

In light-emitting and display, it can be made into single-surface or double-surface light-emitting. No substrate is used or transparent substrate is used. In double-surface light-emitting anti-image will be displayed on the back surface.

If original images are displayed on the front and back surfaces, two layers of photoconduction boards are used and a transparent thin film is sandwiched between them. The two boards have the concave-convex images or are sculpted images on their surfaces with each original direction outside.

Not only the concave-convex images on the panel can be sculpted with machine knife or laser, but also they can be formed through molding or injection-molding. It can use holotype or contrary-type according to market.

Concave depth or convex height is determined on basic of images and volume of paint and is related to luminance.

Regarding to inlaying mode of diodes, they are generally inlayed in the photoconduction board to exhibit enough light-emitting effect and the direction of light-emitting is along to the plane of the photoconduction board (if paster is used, it can be pasted on the end of panel.)

Luminance is determined according to its use to select number and luminance degree of diode. One of its ends is inlayed in the groove or hole, or two, three or four of its ends are inlayed to obtain appropriate luminance.

In order that its structure is firm and beautiful, the ends which inlay diodes are claded with frames to conceal the diodes. Diodes cant be seen from outside. Meanwhile light-emitting effect is ensured.

In order to increase luminance of indirect light-emitting inside the concave-convex images, instant-storing-emitting-light lighting material which has different reflection and refraction coefficient from those of the panel should be inlayed. These material is lighting glue, paint or oil paint. Dye and/or pigment is doped in the material according to use. Sometimes small amount of curing agent can be doped.

Substance is light-reflecting or transparent micro glass beads 7, glass beads 7 which is used for zebra crossing on roads or glass powder. The said lighting glue is transparent and had better cure at normal temperature or when heated little. Cure time should be appropriate so as to produce easily. Different dyes or pigments matching with wavelength of diodes are doped to obtain better effect.

Lighting color glue which has certain transparency and matches with wavelength of diode is used directly.

Lighting oil paint, ink or paint which has certain transparency and matches with wavelength of diode is used directly.

Ordinary gas and filler is used directly.

Photoluminescence material which has long and short afterglow is used directly.

Optical fiber fine particle, quartz optical fiber, plastic optical fiber is used directly. Glue is glue 502 and so on.

Other material which has different reflection and refraction coefficient from panel cures by lighting glue.

Lighting material is lighting altering liquid or oil paint to reach light-emitting effect.

The above lighting material is painted on the concave-convex part. When diodes are electrified, images display out. It emits soft light and has stereo feeling.

When non-drying glue or reflecting-light film is pasted on the panel, its effect is good. When lighting material is sprayed or silk printed directly on the panel, its effect is good. This is convenient to automatic product and increase productivity.

In order that its structure is fast and no pollution, there had better be a transparent protection layer on the outside surface of lighting material.

Image parts can be holed by aiguille or laser or through injection-molding or mold pressing. Diodes must be inlayed in panel or pasted in the groove of the end in order to well exhibit images. If the above lighting material is painted or injected into small holes, its effect will be better. The small holes can pass through the panel or not.

Industry Practicality

The first feature of image display device according to the present invention is higher luminance. It is better than neon light, light box of sight light and display device of EL cold light sources.

Present diodes have very narrow wavelength spectrum and are basically single-color to be seen under sun light. They can have very high luminance. Initiative luminance of image display device according to the present invention is 5-10 folders higher than that of EL, even more than 10 folders. After thousands of hours, it is 10-20 folders higher than that of EL since EL declines fast.

Softness of light is compared with that of EL and better than that of neon light.

Its second feature is lower voltage. Since diode has very low enlightening voltage, 3-36V DC voltage or 3-36V voltage of more than 50 HZ AC voltage can be used and is safe.

Now, the voltage neon light uses is too high. EL requires 80-100V voltage of hundreds of cycles. Cold cathode requires more than one thousand voltage.

Its third feature is DC and low current. Although EL has small current, it requires high AC current so that striking fire easily occurs. Thus it is dangerous when it is used in underpasses.

When image display device according to the present invention has area of 1 square meter, it needs current of only hundreds of milliamperes.

The forth feature is lower power. A billboard of 1 square meter needs less than 10 watt. Fighting fire electronic indictor similar to international and national standard size can is less than 1 watt to meet the requirement of police department. Now EL needs 3-5 watt.

The fifth feature is multi-color. Now diodes have multi-color in nature. Therefore image display device of the present invention can reflect or refract full multi-color. However EL is basically single-color. Although EL has several colors, it loses much luminance and life.

In addition, longer life and lower life are also the features of the present invention.

The device of the present invention can be used for 100 thousand hours since diodes have life of 100 thousand hours which is well-known internationally. Regarding to cost, neon light has high luminance, but its life is shorter and its maintenance cost is high. The device which has same area and image can reduce ⅓ cost comparing with EL.

In its production, no pollutant is formed. It is advantageous for human. It is environmental protection product.

It can be cure, arc, semi-circle or even columniform.

The image display device according to the present invention can be used as back light source of liquid crystal display.

If three-color light-emitting diodes or paste part is used, multi-color back light sources can be exhibited on the same back light source board using simple circuit.

The soft light plane image display device is used as back light source to more easily realize large size liquid crystal display.

Now back light source using light-emitting diodes can not be made large. back light source using EL, daylight or cold cathode tube needs high voltage and AC current and disturb computer. Thus it is difficult to realize multi-color back light source.

According to practical places and requirement of users, non-image and non-word display parts can be covered with metal or hard plastic shell to protect and to increase intensity.

According to use and requirement of users, all surfaces of panel are printed with lighting material. The whole panel emits light, but images don't emit light. This reaches another effect.

The panel can use particular complex board whose double surfaces are thin metal board and middle layer is transparent, transparent engineering plastic, organic glass and so on. Metal images are sculpted on one or two surfaces, then filled of lighting material to realize single- or double-surface display.

The image display device with microlight sources and soft light panel according to the present invention is used for indoor and outdoor billboard, traffic indicator, red, green and yellow lamps for traffic, indicator of street, building and floor, initiative light-emitting vehicle board, taxi running board, road line indicator besides vehicle, station board and artware, indoor and outdoor light ornament, back light source of liquid crystal indicator, indoor and outdoor ornament, large size simulation display and city enlightening project.

It is very suited for indicators of underpass and underground because of its DC, low voltage and low power.

It can be used in combined with solar cells to use on highways, and roads in valleys in much illumination regions.

It is superior to ordinary and EL board used now when it is used for airplanes. It will be the forth generation of fighting fire electronic indicators. The first generation is incandescent lamp. The second generation is daylight lamp. The third generation is thin film EL.

The image display device with microlight sources and soft light panel according to the present invention can combine fighting fire electronic indicator with fighting fire floodlight to use a source so that it can save material and reduce maintenance work.

The device can be used for other places.

What is claimed is:

1. An image display device with microlight and soft light panel comprising
   a plurality of microlight sources; and
   a soft light panel display comprising an image sandwich structure comprising a panel made of a transparent material, said panel having a surface with a concave part,
   wherein
   said microlight sources are selected from dot light sources and tubular light sources;
   said microlight sources are mounted in one or more grooves;
   said grooves are disposed at an edge, a hole, or a side-end of said panel,
   said grooves are covered with one or more frames for shading of light,
   said image sandwich structure is selected from
   (a) a first image sandwich structure-formed through (i) filling astigmatism material and lighting material in the concave part of the panel surface or (ii) printing astigmatism material and lighting material by spraying, or smearing;
   (b) a second image sandwich structure comprising a rough surface, a frosting surface, an ink silk printing, or a UV ink silk printing which is matched-with the panel;
   (c) a third image sandwich structure formed through a shading light layer covering an image part of the panel or a shading light layer covering with a non-image part of the panel; or
   (d) a fourth image sandwich structure composed of one or more concavo-convex stereo images formed on the panel surface or a concavo-convex stereo transparent material inlayed in the panel surface
   said image sandwich structure is formed by small holes densely distributed on the panel,
   the small holes have a depth, and
   powder and/or glue-mixed powder astigmatism material and lighting material or paints, dyes which have different spectrum characteristic is filled and encapsulated in the small holes.

2. The image display device with microlight and soft light panel according to claim 1, wherein said shading light layer is color transparent layer or an opaque printing layer.

3. The image display device with microlight and soft light panel according to claim 1, comprising further
a thin metal board, which is windowed as image cover on the panel surface and single-side covers the surface or envelops it, and
image windows, which are mounted on front and back surfaces of the panel.

4. The image display device with microlight and soft light panel according to claim 1, wherein
the panel is double-layer superposed,
an image carrier is disposed between-two layers,
the image carrier is selected from: (1) words or its duplicate, (2) black and white or color film, (3) picture prepared through printing with non-drying glue, lettering or spraying with reflecting-light film,
the carrier is opaque, translucent, or transparent,
spectrum characteristic of the microlight sources can be selected according to colors of carrier and picture.

5. The image display device with microlight and soft light panel according to claim 4, wherein the panel is superposed by more than two layers, and image carriers are mounted between two adjoining layers.

6. The image display device with microlight and soft light panel according to claim 1, wherein
the panel is superposed by more than two layers,
image carriers are mounted between two adjoining layers.

7. The image display device with microlight and soft light panel according to claim 1, wherein the panel is arc or columniform except flat.

8. The image display device with microlight and soft light panel according to claim 1, wherein
two image layers are mounted on front and back surfaces of the panel,
a shading-light layer mounted in the middle layer of the panel isolate said two image layers.

9. The image display device with microlight and soft light panel according to claim 1, wherein the device is composed of many display devices to form a groupware when it is used for large size display or vehicle cards.

10. The image display device with microlight and soft light panel according to claim 1, wherein
the grooves are arranged with equidistance parallel to the panel surface on all or part of side-end of the panel,
end faces of the grooves are curved; and
a plurality of light-emitting diodes are arranged in the grooves and packaged respectively.

11. The image display device with microlight and soft light panel according to claim 1, wherein filled astigmatism material is obtained by curing of optical fiber particle, quartz optical fiber, plastic optical fiber or micro glass bead with lighting glue.

12. An image display device with microlight and soft light panel comprising,
a plurality of microlight sources; and
a soft light panel display comprising an image sandwich structure comprising a panel made of a transparent material, said panel having a surface with a concave part,
wherein
said microlight sources comprise a plurality of dot light sources
said microlight sources are mounted in one or more grooves;
said grooves are disposed at an edge, a hole, or a side-end of said panel;
said grooves are covered with one or more frames for shading of light;
said image sandwich structure is formed by small holes densely distributed on the panel,
the small holes have a depth; and
powder and/or glue-mixed powder astigmatism material and lighting material or paints, dyes which have different spectrum characteristic is filled and encapsulated in the small holes.

13. An image display device with microlight and soft light panel comprising,
a plurality of microlight sources; and
a soft light panel display comprising an image sandwich structure comprising a panel made of a transparent material, said panel having a surface with a concave part,
wherein
said microlight sources comprise a plurality of dot light sources
said microlight sources are mounted in one or more grooves;
said grooves are disposed at an edge, a hole, or a side-end of said panel;
said grooves are covered with one or more frames for shading of light; and
said image sandwich structure is selected from
(a) a first image sandwich structure formed through (i) filling astigmatism material and lighting material in the concave part of the panel surface or (ii) printing astigmatism material and lighting material by spraying, or smearing;
(b) a second image sandwich structure comprising a rough surface, a frosting surface an ink silk printing or a UV ink silk printing which is matched with the panel;
(c) a fourth image sandwich structure composed of one or more concavo-convex stereo images formed on the panel surface or a concavo-convex stereo transparent material inlayed in the panel surface;
said image sandwich structure is formed by small holes densely distributed on the panel,
the small holes have a depth, and
powder and/or glue-mixed powder astigmatism material and lighting material or paints, dyes which have different spectrum characteristic is filled and encapsulated in the small holes.

14. The image display device with microlight and soft light panel according to claim 13, wherein said shading light layer is a color transparent layer or an opaque printing layer.

15. The image display device with microlight and soft light panel according to claim 13, comprising further
a thin metal board, which is windowed as image cover on the panel surface and single-side covers the surface or envelops it, and
image windows, which are mounted on front and back surfaces of the panel.

16. The image display device with microlight and soft light panel according to claim 13, wherein
the panel is double-layer superposed,
an image carrier is disposed between-two layers,
the image carrier is selected from: (1) words or its duplicate, (2) black and white or color film, (3) picture prepared through printing with non-drying glue, lettering or spraying with reflecting-light film,
the carrier is opaque, translucence or transparent, spectrum characteristic of the microlight sources can be selected according to colors of carrier and picture.

17. The image display device with microlight and soft light panel according to claim 13, wherein
the panel is superposed by more than two layers,
image carriers are mounted between two adjoining layers.

18. The image display device with microlight and soft light panel according to claim 13, wherein the panel is arcuate or columniform in shape.

* * * * *